(12) United States Patent
Hill et al.

(10) Patent No.: US 9,021,783 B2
(45) Date of Patent: May 5, 2015

(54) PULSE DETONATION ENGINE HAVING A SCROLL EJECTOR ATTENUATOR

(71) Applicant: United Technologies Corporation, Hartford, CT (US)

(72) Inventors: James D. Hill, Tolland, CT (US); Michael J. Cuozzo, Palm City, FL (US)

(73) Assignee: United Technologies Corporation, Hartford, CT (US)

( * ) Notice: Subject to any disclaimer, the term of this patent is extended or adjusted under 35 U.S.C. 154(b) by 264 days.

(21) Appl. No.: 13/650,523

(22) Filed: Oct. 12, 2012

(65) Prior Publication Data

US 2014/0311121 A1   Oct. 23, 2014

(51) Int. Cl.
| F02K 7/02 | (2006.01) |
| F23R 3/52 | (2006.01) |
| F23R 7/00 | (2006.01) |
| F02C 5/00 | (2006.01) |

(52) U.S. Cl.
CPC ... F02K 7/02 (2013.01); F23R 7/00 (2013.01); F02C 5/00 (2013.01); F23R 3/52 (2013.01)

(58) Field of Classification Search
CPC ............... F02K 7/02; F02C 5/00; F23R 7/00; F23R 3/52
USPC .......... 60/247, 39.76, 39.38, 39.37, 752–760; 415/184; 431/1
See application file for complete search history.

(56) References Cited

U.S. PATENT DOCUMENTS

| 2,494,821 | A | * | 1/1950 | Lombard ........................ 60/799 |
| 2,526,281 | A | * | 10/1950 | Ryan et al. ...................... 415/77 |
| 2,567,079 | A | * | 9/1951 | Owner et al. ................ 60/39.37 |
| 2,601,194 | A | * | 6/1952 | Whittle ........................... 60/262 |
| 2,648,491 | A | * | 8/1953 | Wood ............................ 417/381 |
| 3,726,084 | A | | 4/1973 | Meier et al. |
| 5,079,918 | A | | 1/1992 | Stull |
| 5,112,118 | A | | 5/1992 | Wiehle |
| 5,112,198 | A | | 5/1992 | Skinner |
| 5,755,196 | A | | 5/1998 | Klassen |
| 7,784,265 | B2 | | 8/2010 | Rasheed et al. |
| 7,836,677 | B2 | * | 11/2010 | Bland ......................... 60/39.37 |
| 8,707,673 | B1 | * | 4/2014 | Flanagan et al. ............. 60/39.37 |
| 2005/0000205 | A1 | * | 1/2005 | Sammann et al. ........... 60/226.1 |
| 2008/0282667 | A1 | * | 11/2008 | Intile et al. .................. 60/39.37 |
| 2010/0031673 | A1 | * | 2/2010 | Maltson ......................... 60/796 |
| 2010/0037617 | A1 | * | 2/2010 | Charron et al. ................ 60/752 |
| 2010/0077719 | A1 | * | 4/2010 | Wilson et al. ................ 60/39.37 |
| 2011/0259015 | A1 | * | 10/2011 | Johns et al. ..................... 60/772 |
| 2011/0302908 | A1 | | 12/2011 | Farshchian et al. |
| 2012/0102916 | A1 | | 5/2012 | Bunker |
| 2012/0131901 | A1 | | 5/2012 | Westervelt et al. |

* cited by examiner

Primary Examiner — William H Rodriguez
Assistant Examiner — Rene Ford
(74) Attorney, Agent, or Firm — Malcolm J. Chisholm, Jr.

(57) ABSTRACT

The engine (10) includes at least one firing tube (12) wherein an exhaust stream (32) from the firing tube (12) drives a turbine (30). A scroll ejector attenuator (40) is secured between and in fluid communication with an outlet end (28) of the firing tube (12) and an inlet (76) of the turbine (30). The attenuator (40) defines a turning, narrowing passageway (72) that extends a distance the exhaust stream (32) travels before entering the turbine (30) to attenuate shockwaves and mix the pulsed exhaust stream (32) into an even stream with minimal temperature differences to thereby enhance efficient operation of the turbine (30) without any significant pressure decline of exhaust stream (32) pressure and without any back-pressure from the attenuator (40) on the firing tube (12).

11 Claims, 2 Drawing Sheets

PULSE DETONATION ENGINE HAVING A SCROLL EJECTOR ATTENUATOR

STATEMENT REGARDING FEDERALLY SPONSORED RESEARCH OR DEVELOPMENT

This disclosure was made with Government support under contract number HR 0011-09-C-0052 awarded by DARPA. The Government has certain rights in this disclosure.

TECHNICAL FIELD

The present disclosure relates to pulse detonation engines and more specifically relates to a scroll ejector attenuator for directing flow of an exhaust stream leaving firing tubes of the engine.

BACKGROUND ART

In the field of pulse detonation engines ("PDEs") it is generally known that such engines operate by producing a series of pulsed detonations within one or more firing tubes of the engine. An oxidant such as atmospheric air and fuel are directed into an inlet of the firing tube and then combusted within the tube. This results in a dramatic pressure rise as a pressure wave of combusted oxidant and fuel moves along the firing tube increasing in velocity to produce a detonation wave that results in very substantial thrust as an exhaust stream passes out of an outlet of the firing tube.

It is also known that PDEs are integrated with traditional turbine engines, wherein the exhaust stream from the pulse detonation engine ("PDE") is directed to flow into the turbine to drive the turbine. In such turbine hybrid PDEs, it is common that the turbine typically drives a compressor to force air into one or more of the firing tubes within the PDE.

While such PDEs have tremendous potential for efficient use of fuel and production of enormous thrust per unit mass of the PDE, they nonetheless also have many challenges that have hindered development of an efficient, long-running PDE for an aircraft or a hybrid turbine PDE for production of electrical power. For example, firing PDE tubes directly into a turbine provides a very efficient system layout or architecture. However, in a typical PDE, firing tubes pulse at different times producing a very unsteady flow of the exhaust stream out of the firing tubes. Additionally, the resulting exhaust stream has an extremely high and uneven temperature with localized temperature spikes, etc. This results in significant structural, thermal and performance duress on the turbine.

Firing directly into the turbine also creates a partial-admission turbine effect, wherein a full force of the exhaust stream from the firing tubes only impacts a partial section of the turbine. Even if the firing tubes discharge around a full annulus of the turbine, the unsteady flow of the pulsed and turbulent exhaust stream has the effect of changing incidence angles with each cycle or pulse. This has the same effect on the turbine as the partial-admission turbine effect resulting from a varying number of firing tubes firing at different times and impacting the turbine. For example, it is known that many PDEs utilize a bundle of firing tubes and activate one, several or all of the tubes to meet varying thrust requirements. Studies of PDEs have shown that unsteady, high-temperature exhaust, while manageable on the basis of an average thermal load, nonetheless has the potential to cause deleterious thermal erosion of turbine air foil surfaces due to high-temperature peaks. It is known that, efficient, long-term operation of turbines requires minimizing vibratory stress. Unfortunately, combining PDEs with turbines imposes great vibratory stress upon the turbine, primarily because of the unsteady, turbulent flow of the exhaust stream at supersonic speeds combined with the fluctuating and extremely high temperatures of the exhaust stream.

Therefore, there is a need for a pulse detonation engine that minimizes structural, thermal and long-term, operational duress upon a turbine driven by an exhaust stream from firing tubes of the pulse detonation engine.

SUMMARY OF THE INVENTION

The disclosure includes a pulse detonation engine including at least one firing tube configured to direct an exhaust stream through an outlet end of the firing tube; a turbine secured in fluid communication with the outlet end of the at least, one firing tube so that the exhaust stream passes into and drives the turbine; and, a scroll ejector attenuator secured in fluid communication with and between the outlet end of the at least one firing tube and the turbine. The scroll ejector attenuator defines a turning, narrowing passageway for directing flow of the exhaust stream from the outlet end of the at least one firing tube through the turning, narrowing passage and out of a discharge end of the scroll ejector attenuator adjacent an inlet of the turbine.

The pulse detonation engine may also be constructed so that a cross-sectional area or a radius of an entry end of the turning, narrowing passage is greater than one of a corresponding cross-sectional area or a radius of the discharge end of the scroll ejector attenuator. Also, cross-sectional areas or radii within the turning, narrowing passageway decrease between the entry end and the discharge end of the scroll ejector attenuator.

The pulse detonation engine may be configured so that a flow length of the turning, narrowing passage is greater than an axial length of the scroll ejector attenuator. For purposes herein, the "axial length" of the scroll ejector attenuator is a shortest distance between the entry passage and the discharge end of the scroll ejector attenuator. Moreover, the "flow length" as used herein means an average distance the exhaust stream passes in transiting from the entry passage to the discharge end of the scroll ejector attenuator.

The scroll ejector attenuator may also include an impact well for re-directing flow of the exhaust stream. The impact wall is configured to be tangential to a flow direction axis parallel to flow of the exhaust stream passing out of the outlet end of the firing tube.

The pulse detonation engine may also include at least a first firing tube and a second firing tube. An ejector portion of the scroll ejector attenuator would be secured between the outlet ends of the first and second firing tubes and the turning, narrowing passageway, and the ejector portion defines an undivided entry passage configured to receive and mix exhaust streams from the at least first and second firing tubes.

Additionally, the ejector portion of the scroll ejector attenuator may define a divided entry passage that defines at least a first entry manifold and second entry manifold configured so that the first entry manifold receives and mixes an exhaust stream from at least the first firing tube and the second entry manifold receives and mixes an exhaust stream from at least the second firing tube.

The scroll ejector attenuator may also define a common passage in fluid communication with a first entry manifold and a second entry manifold defined within a divided entry passage. The common passage would be configured for receiving and mixing the exhaust streams from the first and second entry manifolds and for directing the mixed exhaust streams into the turning, narrowing passageway.

The pulse detonation engine may also be configured so that the turning passageway of the scroll ejector attenuator results in the exhaust stream exiting the discharge end of the scroll ejector attenuator in a swirling orientation relative to a plane defined to be parallel to the discharge end of the scroll ejector attenuator.

The present disclosure also includes a method of directing flow of an exhaust stream from at least one firing tube into an inlet of a turbine of a pulse detonation engine. The method includes receiving and mixing the exhaust stream within an entry passage of a scroll ejector attenuator; turning the flow of the exhaust stream from a direction of the flow of the exhaust stream exiting the at least one firing tube to follow a flow path within a turning, narrowing passageway defined within the scroll ejector attenuator, wherein the flow path within the passageway is greater than an axial length between the entry passage and a discharge end of the scroll ejector attenuator; and, directing flow of the exhaust stream through the discharge end of the scroll ejector attenuator and into the inlet of the turbine.

The aforesaid method of directing flow of the exhaust stream may also include directing the exhaust stream from at least a first firing tube into a first entry manifold of a divided entry passage of the scroll ejector attenuator; directing an exhaust stream from at least a second entry manifold of a divided entry passage of the attenuator; mixing the exhaust stream from the first firing tube within the first entry manifold; mixing the exhaust stream from the second firing tube within the second entry manifold; directing flow of the first exhaust stream from the first entry manifold into a common passage; directing flow of the second entry manifold into the common passage; mixing the first-exhaust stream and the second exhaust stream within the common passage; and then directing flow of the mixed first and second exhaust streams through the turning, narrowing passageway of the scroll ejector attenuator.

The method of directing flow of an exhaust stream may also include directing flow of the exhaust stream through the discharge end of the stroll ejector attenuator so that the flow of the exhaust stream swirls relative to a plane defined to be parallel to the discharge end of the scroll ejector attenuator.

It is a general object of the present disclosure to provide a pulse detonation engine having a scroll ejector attenuator that, overcomes deficiencies of the prior art.

It is a more specific object of the present disclosure to provide a pulse detonation engine having a scroll ejector attenuator that enables efficient operation of a turbine that receives an exhaust stream of firing tubes of the engine to drive the turbine. These and other objects and values of the present disclosure will become apparent in the following detailed description and the accompanying drawings.

DESCRIPTION OF THE PREFERRED EMBODIMENTS

Figure 1:
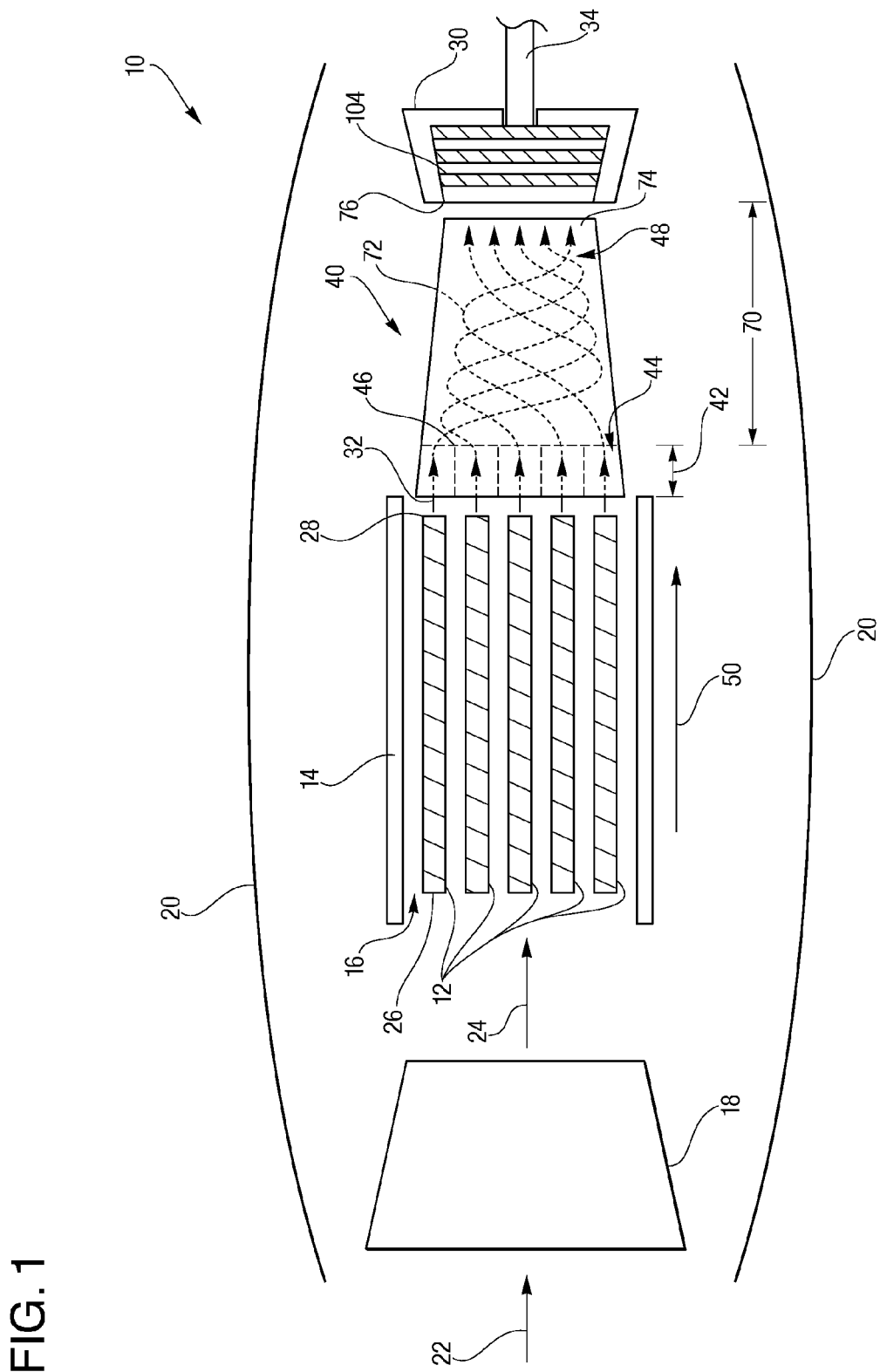
FIG. 1 is a simplified schematic drawing of a pulse detonation engine having a scroll ejector attenuator constructed in accordance with the present disclosure.

Referring to the drawings in detail, FIG. 1 shows a simplified, schematic representation of a pulse detonation engine having a scroll ejector attenuator and is generally designated by reference numeral 10. The pulse detonation engine 10 includes at least one or more firing tubes 12. In FIG. 1 the engine 10 depicts five identical firing tubes 12. The firing tubes 12 are secured within a tube enclosure 14 which may include bypass passages 16 for permitting passage of coolant air to flow adjacent the tubes 12 to cool them during operation of the engine 10. The engine 10 may include a compressor 18 upstream of the tube enclosure 14 for compressing air and directing it into the tube enclosure 14. The engine 10 may also include an engine housing 20 surrounding all of the components of the engine 10. As shown in FIG. 1 atmospheric air passes into the engine housing 20 in s direction designated by arrow 22, through the compressor 18 and in a direction designated by arrow 24 into the tube enclosure 14.

Each of the firing tubes 12 is configured to receive an oxidant and a fuel at an inlet end 26 of the firing tube 12, and each tube 12 is configured to direct an oxidant and fuel combustion exhaust stream through an outlet end 28 of the firing tube 12. A turbine 30 is secured in fluid communication with the firing tubes 12 and is also secured downstream from the outlet ends 28 of the firing tubes 12 so that the exhaust streams 32 pass through and thereby drive the turbine 30. The turbine 30 also includes a turbine shaft 34 for directing rotational power to the compressor IS or to an electrical generator (not shown).

A scroll ejector attenuator 40 is secured in fluid communication with and between the outlet ends 28 of the firing tubes 12 and the turbine 30. The scroll ejector attenuator 40 includes an ejector portion 42 defining an entry passage 44 that is positioned adjacent the outlet ends 28 of the firing tubes 12. The entry passage 44 has a cross-sectional area greater than a cross-section area of the outlet ends 28 of the firing tubes 12. As described above, this permits expansion of the exhaust streams 32 as they enter the entry passage 44 of the attenuator 40. The entry passage 44 also defines an impact wall 46 (shown in hatched lines in FIG. 1) for re-directing flow of the exhaust streams 32 and for merging the exhaust streams into one mixed stream 48.

The impact wall 46 is configured to be tangential to a flow direction axis 50 of the exhaust streams 32 passing out of the outlet ends 28 of the firing tubes 12. Because the impact wall 46 within the entry passage 44 of the ejector portion 42 is structured to be aligned tangentially to the flow axis 50 of the exhaust stream, the impact wall 46 directs the exhaust stream to flow radially inward through the scroll ejector attenuator 40 to the turbine 30. This preserves a tangential momentum of the exhaust stream leaving the firing tubes 12, while providing for mixing of the stream.

A scroll attenuator portion 70 of the scroll ejector attenuator 40 is integral with the ejector portion 42 and includes an exhaust stream flow tunnel that defines a turning, narrowing passageway 72 (shown in the hatched lines 72 with the hatched lines 48 of the mixed exhaust stream in FIG. 1). The turning passageway 72 directs flow of the exhaust stream 48 from the entry passage 44 of the ejector portion 42 through the turning passageway 72 and out of a discharge end 74 of the scroll ejector attenuator 40 adjacent an inlet 76 of the turbine 30. A cross-sectional area or a radius of the entry passage 44 or entry end 44 of the turning passage 72 is greater than a corresponding cress-sectional area or a radius of the discharge end 74 of the scroll ejector attenuator 40.

It is important to stress that, in addition, the cross-sectional areas or the radii within the turning, narrowing passageway 72 decrease between the entry end 44 and the discharge end 74 of the scroll ejector attenuator 40. In other words, the differing cross-sectional areas or differing radii described above are not to foe seen as a large opening followed by a generally, constant cross-section area passageway ending with a small outlet. Instead, the turning passageway 72 has a decreasing diameter to progressively attenuate the exhaust stream 32 passing through the passageway 72. This is referred to as the cross-sectional areas or the radii of the passageway 72 decreasing between the entry end 44 and the discharge end 74 of the scroll ejector attenuator 40.

A flow length of the turning passageway 72 is greater than an axial length of the scroll ejector attenuator. The phrase "axial length" means a shortest distance between the entry passage and the discharge end of the scroll ejector attenuator. The phrase "flow length" means an average distance the mixed exhaust stream 48 passes in transiting from the entry passage 44 to the discharge end 74 of the scroll ejector attenuator 40. (For purposes herein, the word "about" means plus or minus ten percent.)

Figure 2:
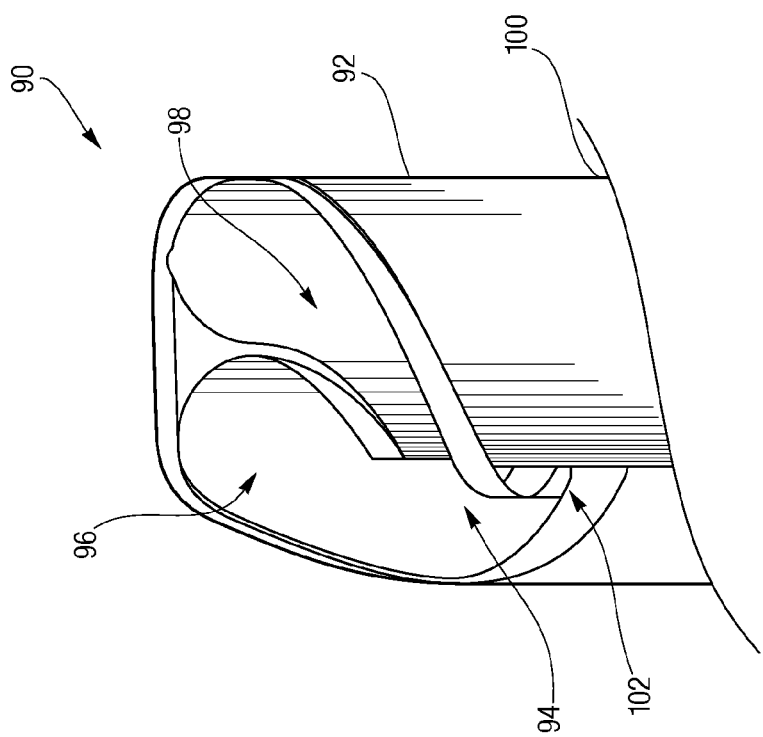
FIG. 2 is a perspective, fragmentary drawing of a first embodiment of a scroll ejector attenuator.

FIG. 2 shows a fragmentary view of a first alternative scroll ejector attenuator 80 showing an ejector portion 82 that defines an undivided entry passage 84 for receiving exhaust streams (not shown) from a first firing tube 86 and from a second firing tube 88 of a pulse detonation engine not shown in FIG. 2). The undivided entry passage 84 of the FIG. 2 embodiment is similar to the entry passage 44 of the ejector portion 42 of the FIG. 1 embodiment and could be located adjacent outlet ends 28 of the firing tubes 12 of the FIG. 1 pulse detonation engine 10. The undivided entry passage 84 that is configured to receive and mix the exhaust streams from a plurality of firing tubes 86, 88. The inventors herein have determined that mixing of the exhaust streams within the scroll ejector attenuator 10, 80 must be controlled to minimize pressure losses within the exhaust streams. For particular arrangements of firing tubes 12, 86, 88, it has been found that an undivided entry passage 84 promotes effective mixing with minimal pressure loss within the exhaust stream.

Figure 3:
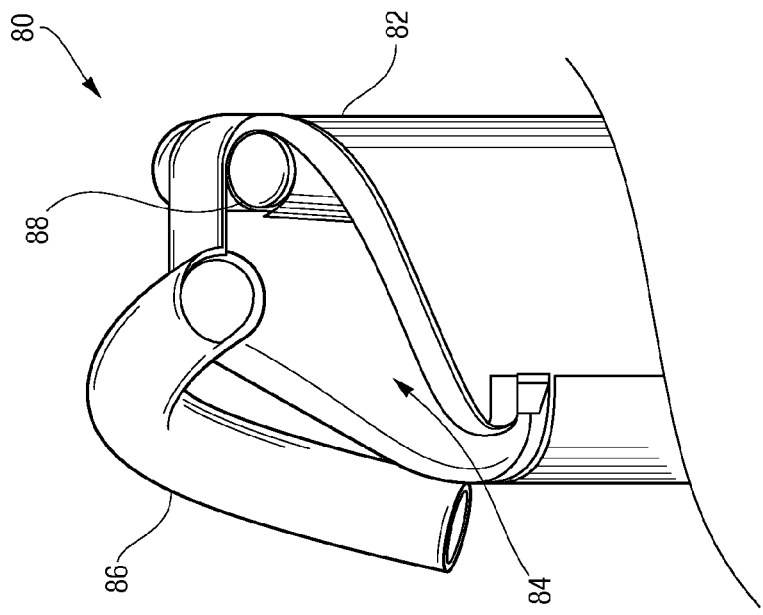
FIG. 3 is perspective, fragmentary drawing of a second embodiment of a scroll ejector attenuator.

FIG. 3 shows a fragmentary view of a second alternative scroll ejector attenuator 90 showing an ejector portion 92 that defines a divided entry passage 94 for receiving exhaust streams (not shown) from firing tubes of a pulse detonation engine (not shown in FIG. 3). The divided entry passage 94 of the FIG. 3 embodiment is similar to the entry passage 44 of the ejector portion 42 of the FIG. 1 embodiment and could be located adjacent outlet ends 28 of the firing tubes 12 of the FIG. 1 pulse detonation engine 10. The divided entry passage 94 defines a first entry manifold 96 adjacent and divided from a second entry manifold 98. The manifolds 96, 98 may be constructed to each receive one or a plurality of exhaust streams from a plurality of firing tubes 12. For example, a pulse detonation engine may include an even number of firing tubes, such as six firing tubes (not shown). The divided entry passage 94 would be configured to have exhaust streams of three firing tubes pass into the first entry manifold 96 and exhaust streams of the other three firing tubes pass into the second entry manifold.

For particular pulse detonation engines 10, depending upon the number and arrangement of firing tubes, it may be appropriate to utilize a divided entry passage 94 to minimize mixing losses within the ejector portion 92 of the scroll ejector attenuator 90. A first mixing of a portion of a total number of firing tubes occurs within the manifolds 96, 98. The scroll attenuator portion 100 of the attenuator 90 may also define a common passage 102 wherein the divided exhaust streams from the first and second manifolds 96, 98 are mixed a second time. The double mixing of the second alternative embodiment of the scroll ejector attenuator 90 results in effective mixing while minimizing pressure losses within the exhaust stream.

As is shown in FIG. 1, the turning passageway 72 of the scroll ejector attenuator 40 results in the exhaust stream exiting the discharge end 74 of the scroll ejector attenuator 40 in a swirling orientation relative to a plane defined to be parallel to the discharge end 74 of the attenuator 40. Therefore, the scroll ejector attenuator 40 may be disposed relative to the turbine 30 so that the swirling exhaust stream enters the inlet 76 of the turbine 30 at a particular orientation that may be matched to maximize efficient impact of the swirling exhaust stream upon turbine blades 104. Because the scroll ejector attenuator 40 produces a swirling exhaust stream, the pulse detonation engine 10 may further benefit by eliminating any need for guide vanes (not shown) that are normally utilized within the turbine inlet 76 to orient a working fluid stream to maximize impact upon turbine blades 104.

The scroll ejector attenuator 40 achieves directing flow of the exhaust stream 32 from the firing tubes 12 along a significantly long length through the turning, narrowing passageway 72 in a very short axial span or overall axial length of the attenuator 40. As the exhaust stream 32 travels this flow distance within the passageway 72, streams of more than one firing tube 12 are mixed together. Additionally, the long flow distance provides sufficient time for any remaining shock waves to be attenuated while the exhaust stream 32 is mixed within itself to provide a steady uniform flow to the turbine 30. Because the impact wall 46 within the entry of the ejector portion 42 and turning passageway 72 is structured to foe aligned tangentially to the flow axis of the exhaust stream 32, the impact wall 46 directs the exhaust stream 32 to flow radially inward through the turning passage of the scroll to the turbine 30. This preserves the tangential momentum of the exhaust stream 32 leaving the firing tubes 12, while providing for mixing of the stream.

Because the cross-sectional area or the radius of the entry end 44 of the turning, narrowing passageway 72 is greater than the corresponding cross-sectional area or the radius of the discharge end 74 of the attenuator portion 70, and because the cross-sectional, areas of the passageway 72 between the entry and discharge end 74 decreases, a flow rate of the exhaust stream. 32 through the passageway 72 must accelerate, which reduces a static pressure of outlets of the firing tubes 12. This in turn increases a dynamic head of the exhaust stream 32 within the attenuator 40 which reduces a pressure gradient between the exhaust stream 32 within the attenuator 40 and the oxidant and fuel within the firing tubes 12. This facilitates a required firing tube 12 fill rate and will also prevent any back flow of the exhaust stream 32 within the attenuator 40 into or adjacent the outlet ends 28 of the firing tubes 12.

Therefore, the present PDE with the scroll ejector attenuator 40 collects the highly unsteady combined flow of exhaust streams 32 passing out of the firing tubes 12 along with any bypass cooling air and delivers this flow to the turbine 30 in a state that will allow the turbine 30 to operate effectively. The scroll ejector attenuator 40 mixes the flow of the exhaust streams 32 with a low total pressure loss, while attenuating the unsteadiness of any Shockwaves within the streams 32, while maintaining a low static pressure at the firing tube 12 outlets to facilitate a high rate of pulsed filling of the tubes 12, while operating in a high-temperature environment; and it does so without increasing an overall length of the PDE 10.

While the above disclosure has been presented with respect to the described and illustrated embodiments of a pulse detonation engine 10 having the described scroll ejector attenuator 40, it is to be understood that the disclosure is not to be limited to those alternatives and described embodiments. For example, while the disclosure describes a plurality of firing tubes 12 within the engine 10, it is to be understood that the disclosure includes a pulse detonation engine 10 having as few as one firing tube 12, or any reasonable number of firing tubes 12. Additionally, the above disclosure describes a compressor 18 upstream of the firing tube enclosure 14. However, it is to be understood that the present pulse detonation engine 10 having a scroll ejector attenuator 40 may not have a compressor. Accordingly, reference should be made primarily to the following claims rather than the foregoing description to determine the scope of the disclosure.

What is claimed is:

1. A pulse detonation engine comprising:
   a. a plurality of firing tubes configured to direct an exhaust stream through outlet ends of the firing tubes;
   b. a turbine secured in fluid communication with the outlet ends of the plurality of firing tubes so that the exhaust stream passes into and drives the turbine; and
   c. a scroll ejector attenuator secured in fluid communication with and between the outlet ends of the plurality of firing tubes and the turbine, the scroll ejector attenuator including an ejector portion integral with a scroll attenuator portion wherein:
      i. the ejector portion includes an entry passage adjacent the outlet ends of the plurality of firing tubes for receiving and mixing the exhaust stream from the firing tubes and is configured to direct the exhaust stream to flow radially inward; and
      ii. the scroll attenuator portion includes an exhaust stream flow tunnel that defines a circumferentially turning, narrowing passageway for directing flow of the exhaust stream from the entry passage of the ejector portion through the circumferentially turning, narrowing passageway and out of a discharge end of the scroll ejector attenuator adjacent an inlet of the turbine.

2. The pulse detonation engine of claim 1, wherein one of a cross-sectional area or a radius of an entry end of the circumferentially turning, narrowing passageway is greater than one of a corresponding cross-sectional area or a radius of the discharge end of the scroll ejector attenuator and cross-sectional areas or radii within the circumferentially turning, narrowing passageway decrease between the entry end and the discharge end of the scroll ejector attenuator.

3. The pulse detonation engine of claim 1, wherein a flow length of the circumferentially turning, narrowing passageway of the scroll attenuator portion is greater than an axial length of the scroll ejector attenuator, the axial length being a shortest distance between the entry passage and the discharge end of the scroll ejector attenuator, the flow length being an average distance the exhaust stream passes in transiting from the entry passage to the discharge end of the scroll ejector attenuator.

4. The pulse detonation engine of claim 1, wherein the ejector portion of the scroll ejector attenuator includes within the entry passage of the elector portion an impact wall for re-directing flow of the exhaust stream, wherein the impact wall is configured to be tangential to a flow direction axis parallel to flow of the exhaust stream passing out of the outlet end of the firing tube.

5. The pulse detonation engine of claim 1, further comprising at least a first firing tube and a second firing tube, and an ejector portion of the scroll ejector attenuator secured between the outlet ends of the first and second firing tubes and the circumferentially turning, narrowing passageway of the scroll attenuator portion, wherein the ejector portion defines an undivided entry passage configured to receive and mix exhaust streams from the at least first and second firing tubes.

6. The pulse detonation engine of claim 1, further comprising at least a first firing tube and a second firing tube, and an ejector portion of the scroll ejector attenuator secured between the outlet ends of the first and second firing tubes and the circumferentially turning, narrowing passageway, wherein the ejector portion defines a divided entry passage that defines at least a first entry manifold and second entry manifold configured so that the first entry manifold receives and mixes an exhaust stream from at least the first firing tube and the second entry manifold receives and mixes and exhaust stream from at least the second firing tube.

7. The pulse detonation engine of claim 6, wherein the scroll ejector attenuator defines a common passage in fluid communication with the first entry manifold and the second entry manifold, wherein the common passage is configured for receiving and mixing the exhaust streams from the first and second entry manifolds and for directing the mixed exhaust streams into the circumferentially turning, narrowing passageway.

8. The pulse detonation engine of claim 1, wherein the circumferentially turning, narrowing passageway of the scroll ejector attenuator results in the exhaust stream exiting the discharge end of the scroll ejector attenuator in a swirling orientation relative to a plane defined to be parallel to the discharge end of the scroll ejector attenuator.

9. A method of directing flow of an exhaust stream from a plurality of firing tubes into an inlet of a turbine of a pulse detonation engine, the method comprising:
   a. positioning a scroll ejector attenuator that has an ejector portion integrated with a scroll attenuator portion to form the scroll ejector attenuator so that an entry passage of the ejector portion is adjacent outlet ends of the plurality of firing tubes and so that a discharge end of the scroll attenuator portion of the scroll ejector attenuator is adjacent the inlet of the turbine; then
   b. receiving and mixing the exhaust stream from the plurality of firing tubes outlet ends within an entry passage of the ejector portion of the scroll ejector attenuator and directing the exhaust steam radially inward; then
   c. turning the flow of the mixed exhaust stream from a direction of the flow of the exhaust stream exiting the plurality of firing tubes to follow a flow path within a circumferentially turning, narrowing passageway defined within the scroll attenuator portion of the scroll ejector attenuator, wherein the flow path within the passageway is greater than an axial length between the entry passage and a discharge end of the scroll ejector attenuator; and then
   d. directing flow of the exhaust steam through the discharge end of the scroll attenuator portion of the scroll ejector attenuator and into the inlet of the turbine.

10. The method of directing flow of an exhaust stream of claim 9, further comprising directing a first exhaust stream from at least a first firing tube into a first entry manifold of a divided entry passage, directing a second exhaust stream from at least a second firing tube into a second entry manifold of the divided entry passage, mixing the exhaust stream from the first firing tube within the first entry manifold, mixing the exhaust stream from the second firing tube within the second entry manifold, directing flow of the first exhaust stream from the first entry manifold into a common passage, directing flow of the second exhaust stream from the second entry manifold into the common passage, mixing the first exhaust stream and the second exhaust stream within the common passage, and directing flow of the mixed first and second exhaust streams through the circumferentially turning, narrowing passageway of the scroll attenuator portion of the scroll ejector attenuator.

11. The method of directing flow of an exhaust steam of claim 9 further comprising directing flow of the exhaust stream through the charge end of the scroll attenuator portion of the scroll ejector attenuator so that the flow of the exhaust stream swirls relative to a plane defined to be parallel to the discharge end of the scroll ejector anttenuator.

* * * * *